United States Patent [19]
Roth et al.

[11] 4,237,492
[45] Dec. 2, 1980

[54] IMAGE OBSERVATION APPARATUS

[75] Inventors: Irving Roth, Williston Park; Ralph Davidson, Old Bethpage, both of N.Y.

[73] Assignee: Sperry Corporation, New York, N.Y.

[21] Appl. No.: 16,991

[22] Filed: Mar. 2, 1979

[51] Int. Cl.³ .............................................. H04N 7/18
[52] U.S. Cl. ................... 358/225; 358/113; 358/226; 358/229; 358/108; 350/172
[58] Field of Search ................ 358/93, 113, 185, 209, 358/225, 226, 229, 108; 350/172

[56] References Cited
U.S. PATENT DOCUMENTS

| | | | |
|---|---|---|---|
| 2,976,357 | 3/1961 | Hammett | 358/226 |
| 3,510,657 | 5/1970 | Mangiaracina | 358/226 |
| 3,891,795 | 6/1975 | Johnson | 358/225 |
| 3,992,629 | 11/1976 | Chapman | 350/172 |
| 4,074,930 | 2/1978 | Folsom | 350/172 |

*Primary Examiner*—Howard W. Britton
*Attorney, Agent, or Firm*—Howard P. Terry; Seymour Levine

[57] ABSTRACT

An apparatus which permits direct observation of an image produced by one image generator, simultaneously permits remote observation of an image produced by a second image generator, and switchably permits the simultaneous observation of both images directly and remotely.

7 Claims, 2 Drawing Figures

IMAGE OBSERVATION APPARATUS

BACKGROUND OF THE INVENTION

1. Field of the Invention

The present invention relates generally to the field of image observations and more particularly to instrumentation which permits direct, remote, and simultaneous observations thereof.

2. Description of the Prior Art

It is well known in the art that an optical telescope can make objects at a distance to appear close at hand. This capability, however, exists only during the daylight hours when the ambient light is above a known threshold. Situations exist, however, which require the detection and observation of targets at night when the ambient light is below the threshold for sighting objects with conventional optical techniques. In these situations, infrared (IR) optometry may be utilized to accomplish the desired object detection. Combining the optical telescope and the IR optometry (which also has daylight capability) day-night detection and observation may be realized. In the prior art, this day-night capability was provided with the multiplicity of equipment comprising conventional telescopes for daylight observations supplemented by IR equipment for night observations. In many applications, in addition to direct observations, it is required that the telescopically viewed object and the representation derived from the IR reception from the object be made available at remote locations. This is generally accomplished by coupling a TV camera to the image lens of the telescope and one to the screen on which the IR picture appears, thus requiring a telescope for direct viewing, a telescope and TV camera for remote viewing, and an IR screen for direct viewing, and an IR screen and TV camera for remote viewing.

It is an object of the present invention to provide, in a single instrument, a first capability which permits a direct observation of the telescopic image and the simultaneous coupling of a TV camera to an IR derived image and a second capability which permits the simultaneous direct viewing of the telescopic and IR images while coupling these images to the TV camera.

SUMMARY OF THE INVENTION

A preferred image observation apparatus constructed according to the principles of the present invention includes a telescope for optically viewing an object, a display unit for receiving electrical signals from an IR detector and displaying on a screen thereof an image of the observed object, an eye piece, a TV camera, and a beam splitter switchably insertable in the instrument to simultaneously direct, in conjunction with appropriately positioned mirrors, images from the image lens of the telescope and the screen of the display unit to the TV camera and the image lens of the eye piece. When the beam splitter is removed from the optical path of the telescope and CRT images, the image on the screen of the CRT is only directed to the TV camera and the image at the image lens of the telescope is only directed to the image lens of the eye piece.

DESCRIPTION OF THE PREFERRED EMBODIMENT

Figure 1:
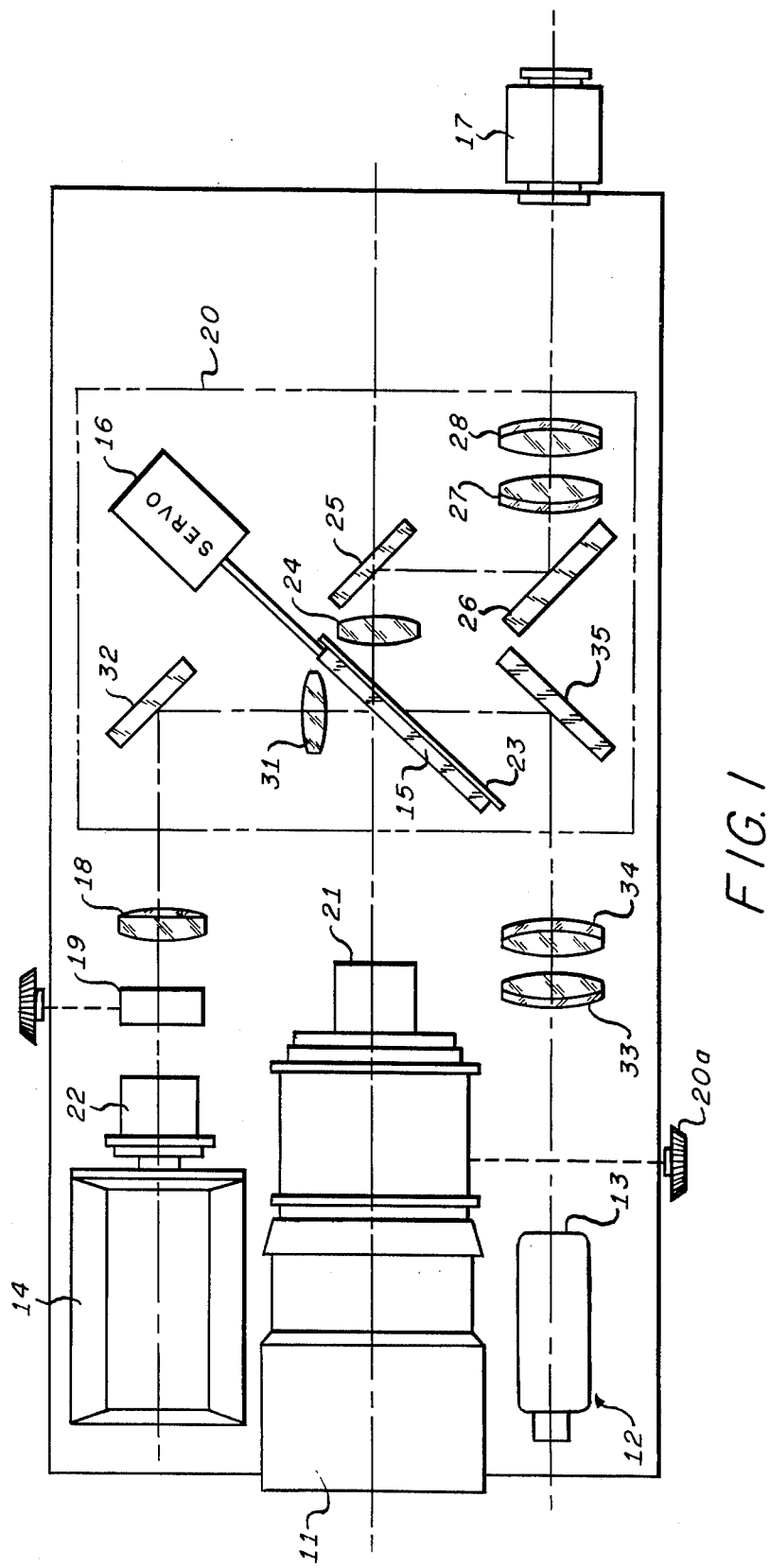
FIG. 1 is a schematic diagram of one preferred embodiment.

Referring to FIG. 1, the principal components of the image observation apparatus 10 may include an optical telescope 11 with image lens 21, an IR monitor 12 with display surface 13, a TV camera 14 with image lens 22, a beam directing system 20 including a variable reflectivity beam splitter 15, and a servo 16 for positioning the beam splitter for the desired reflectivity, and an eye piece 17. The variable reflectivity beam splitter 15 is constructed to provide reflections between substantially 0 and 50% and transmissions of between substantially 100% and 50%, respectively. This variable reflectivity-transmissivity characteristic of the beam splitter provides the means with which an operator may select to observe only the image appearing at the image lens 21 of the optical telescope 11 and simultaneously couple the IR display on display surface 13 to the objective lens 22 of the TV camera 14 or to simultaneously observe the IR display and the optical image through the eye piece 17 while simultaneously coupling the IR display and the optical image to the objective lens 22 of the TV camera 14.

Figure 2:
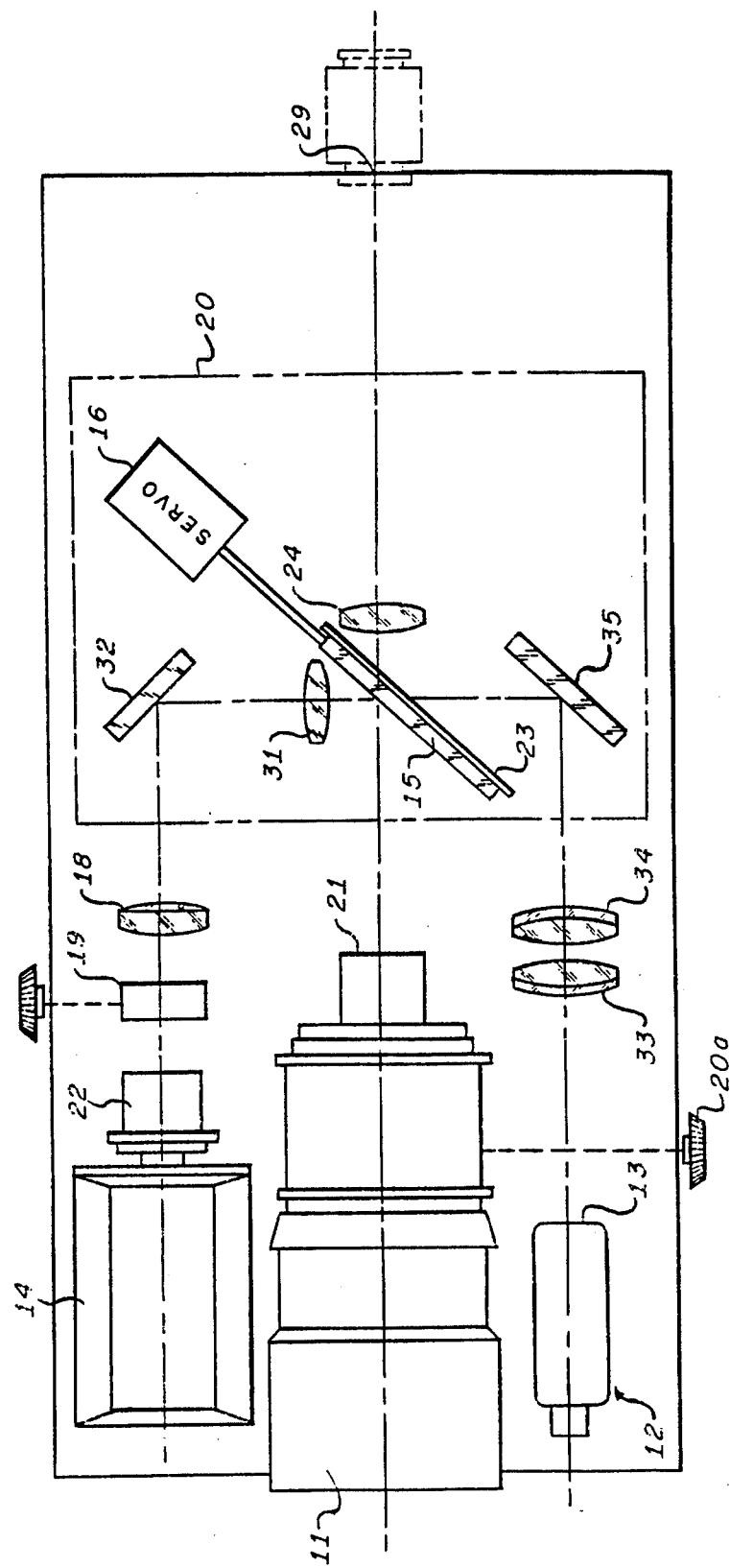
FIG. 2 is a schematic diagram of a second preferred embodiment of the invention.

Assume the beam splitter 15, in the beam directing system 20, has been positioned on track 23 by servo 16 to a desired reflection-transmission position. Light from the image lens 21, the intensity of which may be varied by an internal iris adjustable through external control 20a, incident to the beam splitter 15 will be partially transmitted therethrough and may be incident to a focussing lens 24. Focussing lens 24 may focus the transmitted light onto a mirror 25 to be deflected therefrom to mirror 26 and therefrom to collimating lens 27 from which a collimated beam may be coupled to lens 28 and focussed thereby to the eye piece 17. It will be apparent to those skilled in the art that mirrors 25 and 26 and lenses 27 and 28 may be included to conveniently locate eye piece 17. These components may be omitted and the eye piece 17 relocated to a position 29 for alignment with lens 24 as shown in FIG. 2. A portion of the light incident from image lens 21 to beam splitter 15 is deflected therefrom to lens 31 which focusses the deflected beam to a mirror 32 wherefrom it is deflected to the objective lens 22 via collimating lens 18 and adjustable iris 19 which may be utilized to maintain the light intensity incident to the objective lens 22 within the dynamic range of the TV camera 14.

With the beam splitter 15 positioned for the desired reflection-transmission characteristic, light from the IR display 13 may be collimated by lens 33, coupled therefrom to lens 34, focussed thereby onto mirror 35, and deflected therefrom to be incident to beam splitter 15. The light incident to beam splitter 15 is partially transmitted therethrough and may be focussed by lens 31 to mirror 32 from which it may be directed, via collimating lens 18 and adjustable iris 19, to the image lens 22 of TV camera 14. Light incident to the beam splitter 15 from the IR display 13 via lenses 33, 34, and mirror 35 is partially reflected thereby to be incident to lens 24 wherefrom the light may be focussed onto mirror 25 from which it may be deflected to the eye piece 17 via mirror 26 and lenses 27 and 28. Thus, the beam splitter 15 causes the image of the IR display 13 and the image at the imaging lens 21 to simultaneously appear at both the eye piece 17 and the objective lens 22 of the TV camera 14 wherein the internal adjustable iris may be operated to optimize the relative intensities of the IR and lens images. The variation of the reflectivity-transmissivity of the beam splitter 15 by selective positioning along the track 23 with the servo 16 permits the observer to select a desirable contrast at the eye piece 17 between the telescopic and the IR images.

When the beam splitter 15 is positioned such that the reflectivity and transmissivity are substantially 0 and 100%, respectively, e.g., the beam splitter 15 provides substantially no reflection and all light incident thereto is substantially transmitted therethrough. In this situation, the image at the IR display 13 is coupled to the objective lens 22 of the TV camera 14 via lenses 33, 34, mirror 35, lens 31, and mirror 32 with substantially no IR image coupling to the eye piece 17 and the image at the image lens 21 of the telescope 11 is transmitted to the eye piece 17 via lens 24, mirrors 25 and 26, and lenses 27 and 28 with substantially no telescopic image coupling to the objective lens 22 of the TV camera 14. Thus, when an observer is only desirous of monitoring an external scene by a telescope 11, he may position the beam splitter 15 to provide substantially zero reflectivity and receive an unencumbered image from image lens 21 at eye piece 17.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for viewing a multiplicity of images comprising:
    first and second image generating means:
    first and second means for receiving optical images; and
    beam splitting means positioned in the optical paths of images generated by said first and second image generators for directing said images to said first and second optical image receiving means, said beam splitting means for controllably reflecting and transmitting portions of a light beam incident thereto to vary the percentages of said incident light beam reflected and transmitted, the range of said variations including substantially 0% reflection and substantially 100% transmission.

2. An apparatus for viewing a multiplicity of images in accordance with claim 1 wherein said beam splitting means is controllable to obtain reflections between substantially 0% and 50% of incident light beams and concomitant transmissions between substantially 100% and 50%.

3. An apparatus for viewing a multiplicity of images in accordance with claims 1 or 2 wherein said directing means further includes:
    first means for deflecting said beam reflected from said beam splitting means to said first optical receiving means; and
    second means for deflecting said beam transmitted through said beam splitting means to said second optical receiving means.

4. An apparatus for viewing a multiplicity of images in accordance with claim 3 wherein said directing means further includes third means positioned in the optical path of said second image generating means for deflecting light beams therefrom to said beam splitting means.

5. An apparatus for viewing a multiplicity of images in accordance with claim 4 further including means for collimating light deflected from said first deflecting means, and means positioned between said collimating means and said first optical receiving means for selectably varying the intensity of collimated light beams incident to said first optical receiver means.

6. An apparatus in accordance with claim 5 wherein said first image generating means includes means for varying the intensity of an image projected therefrom.

7. An apparatus for viewing a multiplicity of images in accordance with claim 4 wherein:
    said first image generating means is an optical telescope;
    said second image generating means is a display surface of an electronically generated display means;
    said first receiving means is a television camera; and
    said second receiving means is an optical eye piece.

* * * * *